United States Patent [19]

Cabrera et al.

[11] Patent Number: 5,098,576

[45] Date of Patent: Mar. 24, 1992

[54] ADSORBENTS FOR CHROMATOGRAPHY AND ADSORPTION PROCESSES

[75] Inventors: Karin Cabrera, Grosse Gerau; Willi Jost, Postfach; Karl-Friedrich Krebs, Rossdorf, all of Fed. Rep. of Germany

[73] Assignee: Merck Patent Gesellschaft MIT Beschrankter Haftung, Darmstadt, Fed. Rep. of Germany

[21] Appl. No.: 700,327

[22] Filed: May 9, 1991

Related U.S. Application Data

[63] Continuation of Ser. No. 431,347, Nov. 3, 1989, abandoned.

[30] Foreign Application Priority Data

Nov. 5, 1988 [DE] Fed. Rep. of Germany ....... 3837614

[51] Int. Cl.⁵ .............................................. B01D 15/08
[52] U.S. Cl. .................................... 210/656; 210/635; 210/198.2; 210/502.1
[58] Field of Search ...................... 210/635, 656, 198.2; 530/413; 436/161

[56] References Cited

U.S. PATENT DOCUMENTS

| | | | |
|---|---|---|---|
| 3,922,392 | 11/1975 | Kohlschutter | 210/656 |
| 3,960,720 | 6/1976 | Porath | 210/635 |
| 4,133,753 | 1/1979 | Takeuchi | 210/656 |
| 4,178,270 | 12/1979 | Fujita | 502/182 |
| 4,225,463 | 9/1990 | Unger | 210/656 |
| 4,431,546 | 2/1984 | Hughes | 210/656 |
| 4,648,975 | 3/1987 | Barkatt | 210/656 |
| 4,652,529 | 3/1987 | Collins | 210/656 |
| 4,770,781 | 9/1988 | Schmidt | 210/635 |
| 4,808,233 | 2/1989 | Pfannkoch | 210/656 |
| 4,859,342 | 8/1989 | Shirasawa | 210/656 |

FOREIGN PATENT DOCUMENTS

| | | | |
|---|---|---|---|
| 206721 | 12/1986 | European Pat. Off. | 210/656 |
| 1501445 | 2/1978 | United Kingdom | 210/656 |

OTHER PUBLICATIONS

CA 90:210656c, p. 437, 1979.
Meyer, Praxis der Hochleistungs-Flussigchromatographie, 1979, title page and table of contents, pp. V-IX.
Unger, "Porous Silica: Its Properties and Use as Support in Column Liquid Chromatography", Journal of Chromatography Library, vol. 16, 1979, title page and table of contents, pp. V-IX.
Chemical Abstract vol. III, No. 100023p, p. 167, 1989.
Snyder, Introcduction to Modern Liquid Chromatography, 1979, John Wiley & Sons, New York, pp. 177-183, 270-272, 281-288, and 684-685.
Columbe, Investigation of New Column Packings for Molecular Weight Determination of Heavy Fractions by Size Exclusion Chromatography, Energy Research Laboratories Division Report ERL 87-74(TR) Canada, Mar. 1987, A 16 page article.
Mikes Laboratory Handbook of Chromatographic and Allied Methods, John Wiley & Sons, New York, 1979, p. 557.

Primary Examiner—Ernest G. Therkorn
Attorney, Agent, or Firm—Millen, White & Zelano

[57] ABSTRACT

In adsorption and chromatography proceseses for the separation of at least one substance from a mixture of substances, silicon carbide is used as the adsorbent and as a support material in such processes.

14 Claims, 7 Drawing Sheets

ADSORBENTS FOR CHROMATOGRAPHY AND ADSORPTION PROCESSES

This application is a continuation of application Ser. No. 07/431,347, filed Nov. 3, 1989, now abandoned.

BACKGROUND OF THE INVENTION

The present invention relates in general to chromatography and adsorption processes and, more particularly, to a novel adsorbent comprising silicon carbide, which is especially suitable as a support in chromatography.

Numerous materials are known which are able to adsorb one or more different substances, for example, cellulose, kieselguhr, alumina, and, above all, silica gel in its various modifications. However, some of these materials, particularly silica gel, are unstable in an alkaline medium. Consequently, they cannot be employed or can be employed only to a limited extent for certain substances which are only stable to bases, i.e., in particular, for substances of biological origin. Moreover, when subjected to undue mechanical stresses, such as frequent stirring or the use of high pressure in liquid chromatography, silica gel tends to be unstable. Porous materials, in particular, break and crumble easily and thus lose their usefulness as adsorbents.

It is thus desirable to have an adsorbent and chromatographic support material which has high physical and chemical stability, as well as good adsorption and separation capabilities.

SUMMARY OF THE INVENTION

It has now been found that silicon carbide can successfully be employed as an adsorbent and chromatographic support material. This invention provides a chromatographic or adsorption process for separating one or more substances from a mixture of substances by the selective collection and concentration of at least one substance on the solid surface of an adsorbent, using an adsorbent comprising silicon carbide. The process can be carried out in an acidic or alkaline medium and under pressure. The silicon carbide can be used as a support material in a chromatographic process and also can be applied as a layer or film to a substrate of glass, aluminum foil, or plastic film for use in analytical or preparative thin-layer chromatography.

On the basis of its physical and chemical properties, such as great hardness, extreme inertness to reaction, high thermal conductivity, and low thermal expansion, silicon carbide has been employed for many years as a valuable material in many different industrial fields. Silicon carbide has been used, for example, as a deoxidizing and alloying agent in the chemical industry, as a refractory material in the ceramic industry, as an abrasive and lubricant, as a lining material in blast furnaces, as a construction material for gas turbines and turbocharger wheels, and as a reinforcing material in aerospace applications. An exhaustive description of the properties, preparation methods, and fields of application of silicon carbide can be found in *Gmelin Handbook of Inorg. Chem.*, Vol. B, "Silicon Carbide", 1986, Springer Verlag.

On the basis of the applications of silicon carbide known hitherto, it was surprising to discover that silicon carbide can be used as an adsorbent and chromatographic material.

In its separation behavior (elution sequence), silicon carbide used as a chromatographic support material compares qualitatively with unmodified silica gel. However, based on a defined active surface area, in some cases, silicon carbide surprisingly has a markedly higher selectivity than silica gel. Very good separating efficiencies or adsorptions can thus be obtained with relatively little material. Mechanical stresses (for example, high pressures) cause practically no changes in texture and stability of the silicon carbide support or adsorbent material. This material has also been found to be inert toward most chemical agents, for example, strong acids, bases, or aggressive solvents. Pre- and post-treatments of the material with strong bases, for example, for purification purposes, can thus be carried out without the chromatographic support decomposing or destabilizing.

In contrast to other known support materials, particularly silica gel, substances can be adsorbed or chromatographed on silicon carbide in an alkaline media without problems. This is particularly advantageous for the chromatography of biological substances such as peptides, proteins, body fluids, and pharmaceutically active compounds.

According to the invention, adjustment of the pH alone was found to have a controlling influence on the separation behavior or selectivity of the absorbent and chromatographic material of this invention, in particular in the acidic/alkaline transition zone. By adjusting the pH, even a reversal of the elution sequence of the substances to be separated can be achieved in certain cases. Silicon carbide has been found to have a large number of decisive advantages as an adsorbent and chromatographic support material. The invention thus relates to an adsorbent material consisting essentially of silicon carbide.

The invention further relates to the use of silicon carbide as an adsorbent and, support material in adsorption selective liquid chromatographic processes.

As is known, the effectiveness of adsorbents and chromatographic support materials is predominantly determined by the size of the specific or active surface area. This, in turn, depends, inter alia, on the nature of the surface, particle size and shape, and, if appropriate, porosity or pore volume. For this reason, the preparation method and any purification and post-treatment steps which may be carried out influence to a high degree, the quality and performance of an adsorbent. This also applies to the adsorbent or chromatographic material prepared according to the invention. Commercially available silicon carbide is mostly prepared by the known Acheson or ESK process and is offered in various particles sizes obtained by means of grinding.

According to the invention, it is preferred to use silicon carbide powders prepared in this way and having an average particle diameter between 0.5 $\mu$m and 2,000 $\mu$m, more preferably between 1 $\mu$m and 100 $\mu$m. These powders can successfully be employed for both chromatographic separations and adsorptions. Silicon carbide with an average particle diameter between 1 $\mu$m and 50 $\mu$m is most preferred.

However, according to the invention, silicon carbide is also suitable which has been prepared by other methods, for example, from silicon hydride and carbon, inorganic chlorosilane, organic chlorosilanes, or organic polymeric chlorosilanes, by methods known in the literature, e.g., by pyrolysis, sublimation, or vapor-phase sedimentation (summary in *Gmelin Handbook, loc. cit.*).

By using these processes, silicon carbide particles having different sizes, shapes, and surface structures, and thus variable chromatographic properties, can be formed.

The invention also includes adsorbent or chromatographic support material of the type in which silicon carbide is applied in layers or films to molded articles or auxiliary supports by means of known techniques. Such materials can be, for example, glass or plastic particles, kieselguhr, silica gel, alumina, or even silicon carbide itself, and have the advantage that silicon particles of defined size and regular, e.g., (spherical) shape can be produced in a controlled manner. In such cases, the particle diameters can optionally be less or greater than those in the above-indicated ranges.

According to the invention, industrially prepared silicon carbide can be agglomerated by known methods using conventional binders suitable for the purpose to obtain, for example, a larger and/or spherical material.

The silicon carbide adsorbent and chromatographic support material of the present invention can also be subjected to known physical and/or chemical treatment processes before or after use in order to improve or restore the separation efficiency of the material by surface action, if necessary. Suitable physical pre- or post-treatments of silicon carbide are, for example, heat treatment or sintering with or without auxiliaries. Silicon carbide can be subjected to pre- or post-treatments chemically, for example, with concentrated or dilute, strong, or weak inorganic or organic acids or bases, or with organic solvents, water, buffer solutions, or water/solvent mixtures. Bases such as 0.1 N to 1 N NaOH or KOH are preferable for purification purposes. By this means, any free silicon, as well as undesired metals, such as magnesium and aluminum, which may be present are removed. Other surface contaminants can be removed in a known manner, for example, using agents such as HCl, HF, $H_2SO_4$, $HF/NHO_3$, or polar organic solvents such as acetone, dimethyl sulfoxide, or dimethylformamide.

As a rule, a pre- or post-treatment of silicon carbide results in an improvement in the adsorptive or chromatographic properties or an adaptation to the desired application.

According to the invention, the novel adsorbent material can also be modified on its surface. In this connection, non-polar organic radicals, for example, alkyl chains, can be polymerized onto the silicon carbide surface with the aid of known techniques. The resulting reversed phase materials (RP) are similar in their chromatographic behavior to the correspondingly modified silica gels but, in comparison, have the previously mentioned advantages. When used in chromatography in the alkaline range, the elution sequence with RP-modified silicon carbide can be reversed compared with RP-modified silica gel. This can advantageously be utilized to increase the selectivity.

Silicon carbide which can be packed into columns is ideally suited for high pressure liquid chromatography. Since the separation efficiency of silicon carbide is very high, the use of long columns requiring high pressures is generally unnecessary. However, since the silicon carbide can withstand mechanical stresses, it can be used at pressures higher than used in columns containing silica gel.

Conventional coating processes can also be used to apply silicon carbide to glass sheets, aluminum foil, or plastic films, with or without known binders or adhesives. Such coated substrates can thus be made available for analytical or preparative thin-layer chromatography. Silicon carbide can also be employed in batch processes.

According to the invention, concentrating substances, indicators, or other additives used for specific separation problems can also be added to the silicon carbide adsorbent material.

Since modified and unmodified silicon carbide behaves qualitatively like modified and unmodified silica gel, respectively, the mobile phases necessary in each case correspond approximately qualitatively. Therefore, only relative little optimization is necessary for silicon carbide systems as compared to silica gel systems.

Use of silicon carbide as an adsorbent includes fully conventional considerations used for prior art adsorbers, e.g., as disclosed in K. Unger, Porous Silia: Its Properties and Use as Support in Column Liquid Chromatography (1979), Elsevier Netherlands or in V. Meyer, Praxis der Hochleistungschromatographie (1988), Moritz-Diesterweg-Verlag, Frankfurt, West-Germany.

BRIEF DESCRIPTION OF THE DRAWINGS

Various other objects, features, and attendant advantages of the present invention will be more fully appreciated as the same becomes better understood when considered in conjunction with the accompanying drawings.

The figures herein are the elution diagrams obtained for the examples described hereinafter. These figures plot the concentration of one or more substances in terms of eluent versus time. In these plots.

In the foregoing and in the following example, all temperatures are set forth uncorrected in degrees Celsius; and, unless otherwise indicated, all parts and percentages are by weight.

The entire texts of all applications, patents and publications, cited above and below, and of corresponding West German Application No. P 38 37 614.8, filed Nov. 5, 1988, are hereby incorporated by reference.

EXAMPLES

Example 1

Silicon carbide from Lonza Ltd. (Basle, Switzerland), having an average particle diameter of 3 μm and a specific surface area of about 1 m²/g (UF-05) (essentially unporous) is packed in a known manner into a column (LiChro CART ®, E. Merck, Darmstadt), 125×4 mm. A mixture of anthraquinone (1), anisaldehyde (2), dimethyl phthalate (3), 3-nitroacetophenone (4), dimethylaminobenzaldehyde (5), and Vitamin D₃ (6), dissolved in heptane, is injected onto the column. The column is eluted using n-heptane at 103 bar and 1 ml/min. Detection is carried out in the UV region at 250 nm.

| Retention times: | (1-4): | 1.21 min. |
|---|---|---|
| | (5): | 1.33 min. |
| | (6): | 1.65 min. |

Figure 1:
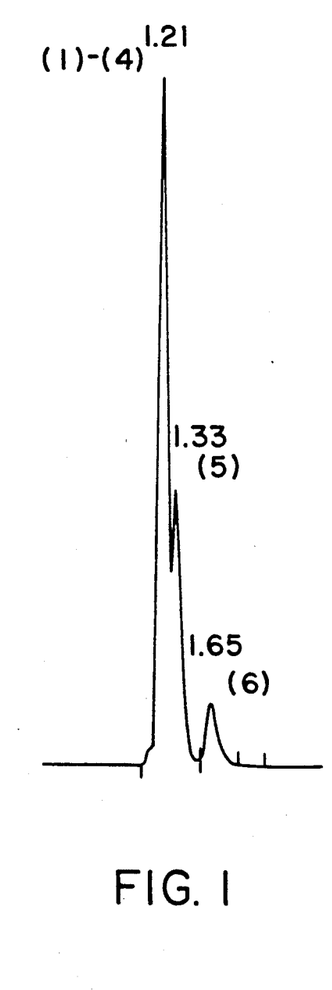
FIG. 1 shows separation of a mixture of anthraquinone (1), anisaldehyde (2), dimethyl phthalate (3), 3-nitroacetophenone (4), dimethylaminobenzaldehyde (5), and Vitamin $D_3$ (6) on a silicon carbide column (particle size, 3 μm; specific surface area, 1 $m^2/g$; column dimension, 125×4 mm) using n-heptane as the eluent. The retention times are given in minutes.

In spite of the extremely low specific surface area of the silicon carbide used and the still unoptimized eluent system, a separation, even if it is not yet complete, can be observed (FIG. 1).

Example 2

Figure 2:
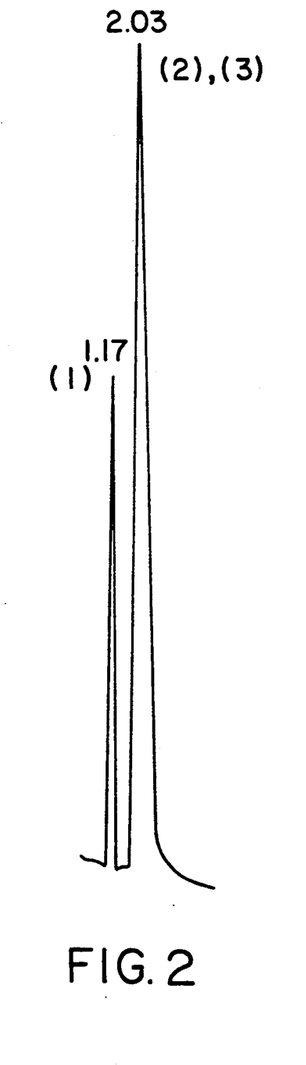
FIG. 2 shows separation of a mixture of 2-nitroacetanilide (1), 3-nitroacetanilide (2), and 4-nitroacetanilide (3) on a silicon carbide column (3 μm, 1 $m^2/g$, 125×4 mm) using tert.-butyl methyl ether as the eluent.

A mixture of 2-nitroacetanilide (1), 3-nitroacetanilide (2), and 4-nitroacetanilide (3) dissolved in heptane/dioxane is applied to the column described in Example 1, and is eluted using tert.-butyl methyl ether under the conditions of Example 1. An elution diagram shown in FIG. 2 is obtained.

| Retention times: | (1): | 1.17 min. |
|---|---|---|
| | (2 + 3): | 2.03 min. |

3- and 4-nitroacetanilide cannot be completely separated under the still unoptimized conditions.

Example 3

Figure 3:
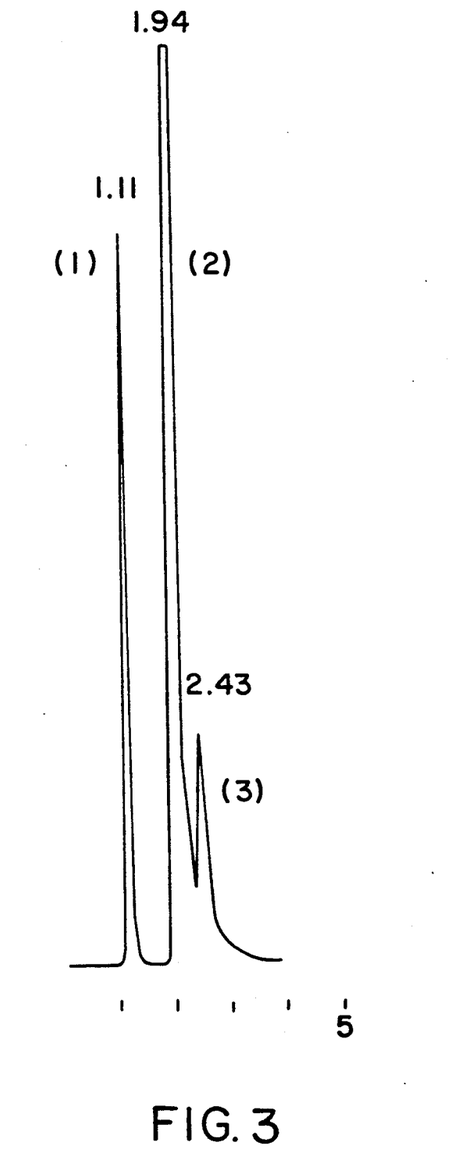
FIG. 3 shows separation of a mixture of 2-nitroacetanilide (1), 3-nitroacetanilide (2), and 4-nitroacetanilide (3) on a silicon carbide column (3 μm, 1 $m^2/g$, 125×4 mm) using n-heptane/dioxane 80/20 (V/V) as the eluent.

A mixture of 2-, 3-, and 4-nitroacetanilide is eluted analogously similar to Example 2 using an eluent mixture consisting of n-heptane/dioxane 80/20 (V/V). An elution diagram shown in FIG. 3 is obtained.

| Retention times: | 2-nitroacetanilide: | 1.11 min. |
|---|---|---|
| | 3-nitroacetanilide: | 1.93 min. |
| | 4-nitroacetanilide: | 2.43 min. |

The three isomers are separated despite the low surface area.

It is evident from Examples 1-3 that the elution sequence corresponds to that of silica gel.

Example 4

A column packed with silicon carbide (3 μm, 1 m²/g), analogous to Example 1, is flushed with several column volumes of aqueous NaOH solution at pH 11.5 before charging with the mixture to be separated, consisting of 2-, 3-, and 4-nitroacetanilide. The eluate contains aluminum and traces of magnesium, calcium, iron, manganese, chromium, nickel, titanium, and carbon, but no silicon. After exchanging the NaOH solution for an 80/20 (V/V) n-heptane/dioxane mixture, the nitroacetanilide mixture is applied and eluted as described.

| Retention times: | 2-nitroacetanilide: | 1.18 min. |
|---|---|---|
| | 3-nitroacetanilide: | 2.56 min. |
| | 4-nitroacetanilide: | 3.61 min. |

Compared with Example 3, the retention times have increased, and the distances between the individual elution profiles have increased. Owing to the pretreatment, the separation becomes more selective under otherwise identical conditions.

Example 5

Figure 4A:
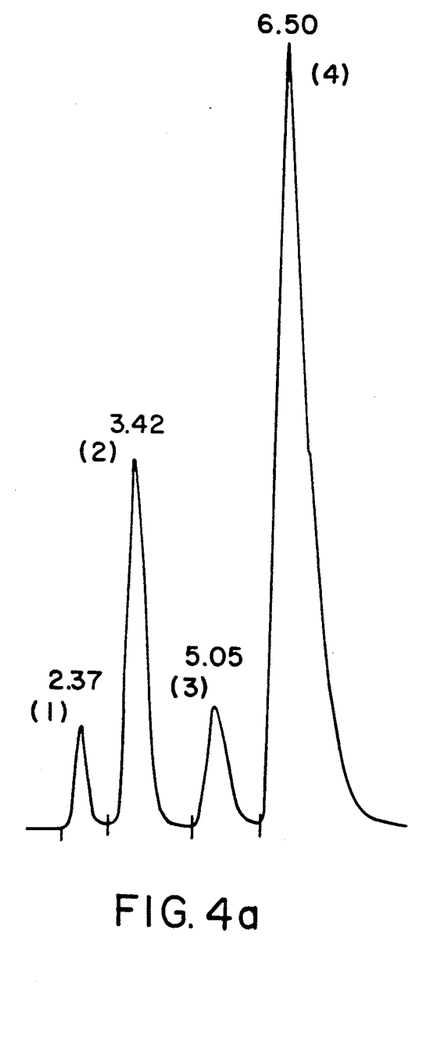
FIG. 4a shows separation of a mixture of anisole (1), 3-nitroanisole (2), 4-nitroanisole (3), and 2-nitroanisole (4) on a silicon carbide column (1.5 μm, 15 $m^2/g$, 30×40 mm, bulk density 0.8 $g/cm^2$) using n-heptane as the eluent.

Silicon carbide having an average particle diameter of 1.5 μm and an average specific surface area of 15 m²/g (Lonza, UF-15) is suspended in an alkaline solution (pH 10-13) for several days and then packed into a column (LiChro CART ® 30/4, E. Merck, Darmstadt). After applying a mixture consisting of anisole (1), 3-nitroanisole (2), 4-nitroanisole (3), and 2-nitroanisole (4), the column is eluted using n-heptane at 150 bar and 0.2 ml/min. (detection: 250 nm UV). An elution diagram shown in FIG. 4a is obtained.

| Retention times: | (1): | 2.37 min. |
|---|---|---|
| | (2): | 3.42 min. |
| | (3): | 5.05 min. |
| | (4): | 6.50 min. |

The separation of the four (nitro)anisoles is exceptional.

Example 6

A mixture of oligophenylenes is applied to a column pretreated and packed (15 m²/g; bulk density, 0.8 g/cm³) as in Example 5: (1) benzene, (2) biphenyl, (3) 1,3-terphenyl, (4) quaterphenyl, and (5) m-quinquephenyl.

Figure 5A:
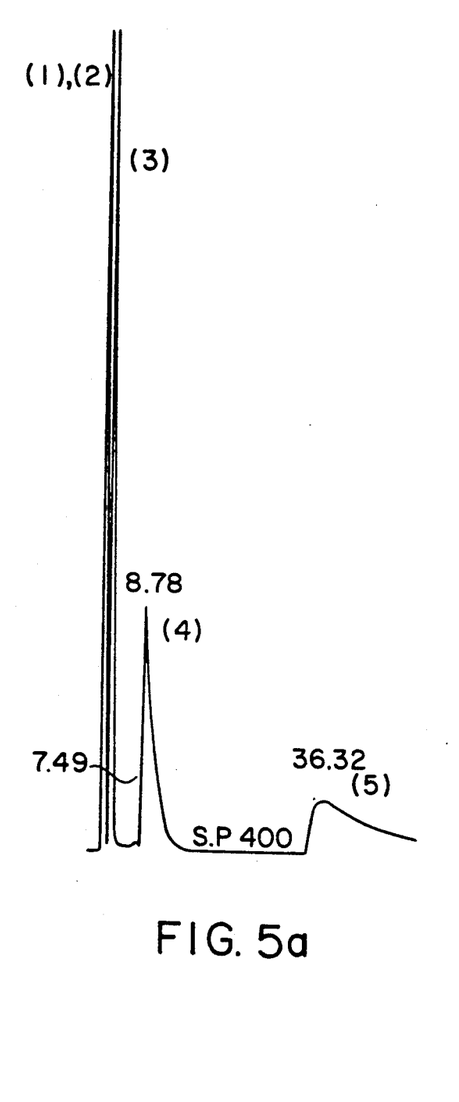
FIG. 5a shows separation of a mixture of benzene (1), biphenyl (2), 1,3-terphenyl (3), quaterphenyl, and m-quinquephenyl on a silicon carbide column (1.5 μm, 15 $m^2/g$, 30×4 mm, bulk density 0.8 $g/cm^3$) using n-heptane as the eluent.

The elution is carried out using n-heptane under otherwise identical conditions, described with respect to Example 5. An elution diagram shown in FIG. 5a is obtained.

| Retention times: | (1): | 2.46 min. |
|---|---|---|
|  | (2): | 3.46 min. |
|  | (3): | 6.48 min. |
|  | (4): | 8.78 min. |
|  | (5): | 36.32 min. |

Example 7

Figure 5B:
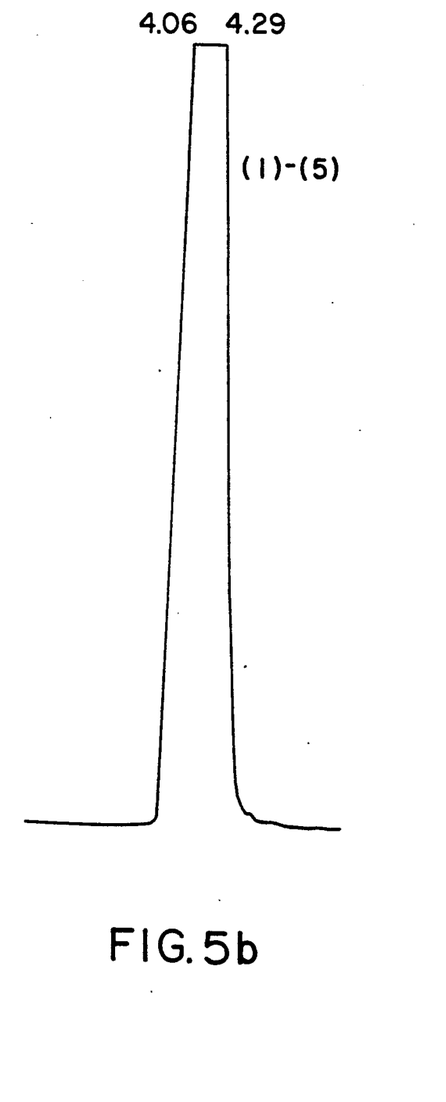
FIG. 5b shows separation of the same mixture on a silica gel column (10 μm, 33 $m^2/g$, 30×4 mm, bulk density 0.4 $g/cm^3$) using n-heptane as the eluent.

In order to directly compare the selectivities of silicon carbide with silica gel, a column is prepared using silica gel, the active surface area of which corresponds approximately to that of the silicon carbide column of Example 6. For this purpose, LiChrospher® Si 1000 silica gel, 10 μm (E. Merck, Darmstadt) having an average specific surface area of 33 m²/g and a bulk density of 0.4 g/cm² is packed into a column (30×4 mm). The same mixture of oligophenylenes as in Example 6 is applied, and n-heptane is likewise used for elution. An elution diagram shown in FIG. 5b is obtained. Virtually no separation of the oligophenylenes occurred. The selectivity of silica gel compared to silicon carbide is then clearly lower in this instance.

Example 8

Figure 4B:
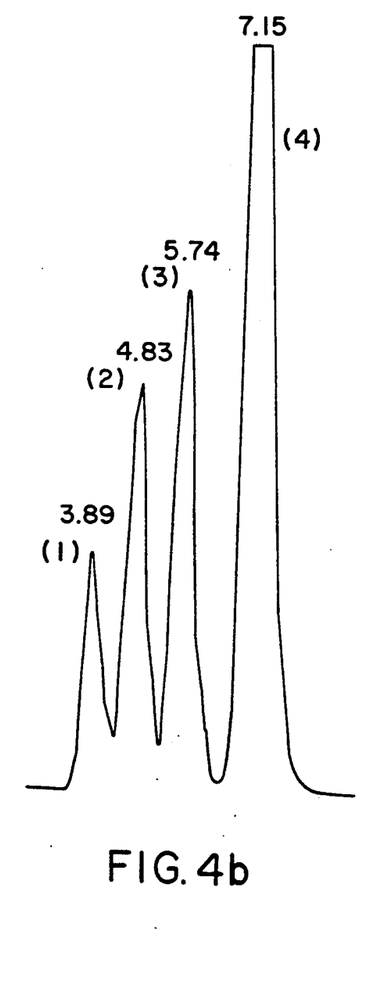
FIG. 4b shows separation of the same mixture on a silica gel column (10 μm, 33 $m^2/g$, 30×4 mm, bulk density 0.4 $g/cm^3$) using n-heptane as the eluent.

A mixture of anisole in (1), 3-nitroanisole (2), 4-nitroanisole (3), and 2-nitroanisole (4) is applied to into a silica gel column analogous to Example 7 and eluted using n-heptane. A separation is obtained as shown in FIG. 4b which, again, is less selective in comparison to a corresponding silicon carbide column (Example 5, FIG. 4a).

Example 9

Figure 6:
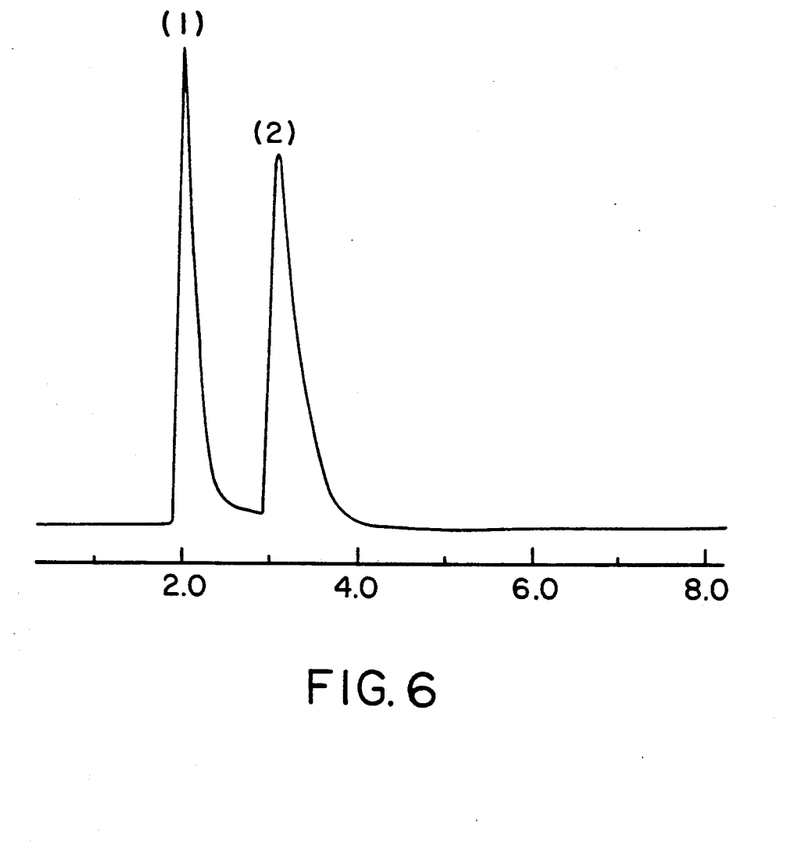
FIG. 6 shows separation of a mixture of the beta-blocker atenolol (1) and propanolol (2) on a column of silicon carbide modified with polybutadiene (base material, silicon carbide 15 m²/g; particle size >4 μm) using acetonitrile/potassium phosphate buffer (pH 2.3), 10/90 (V/V) as the eluent. Retention times are given in minutes.

Silicon carbide having a particle diameter of more than 4 μm and an average specific surface area of 15 m²/g (Lonza, UF-15) (essentially unporous) is surface-modified without further pretreatment by burning on polybutadiene in a manner known per se (for example, Schomburg et al., Chromatographia, Vol. 19, p. 170, 1984) so that a material having reversed phase properties is obtained. This material is then packed into a column (LiChro CART® 125/4, E. Merck, Darmstadt). After applying a mixture of the beta-blockers atenolol (1) and propanolol (2), the column is eluted using a solvent mixture consisting of acetonitrile and 6.7 g/l of potassium dihydrogen phosphate/phosphoric acid pH 2.3, 10/90 (V/V) at 150 bar and 0.5 ml/min. (detection at 227 nm UV). An elution diagram shown in FIG. 6 is obtained.

Example 10

Figure 7A:
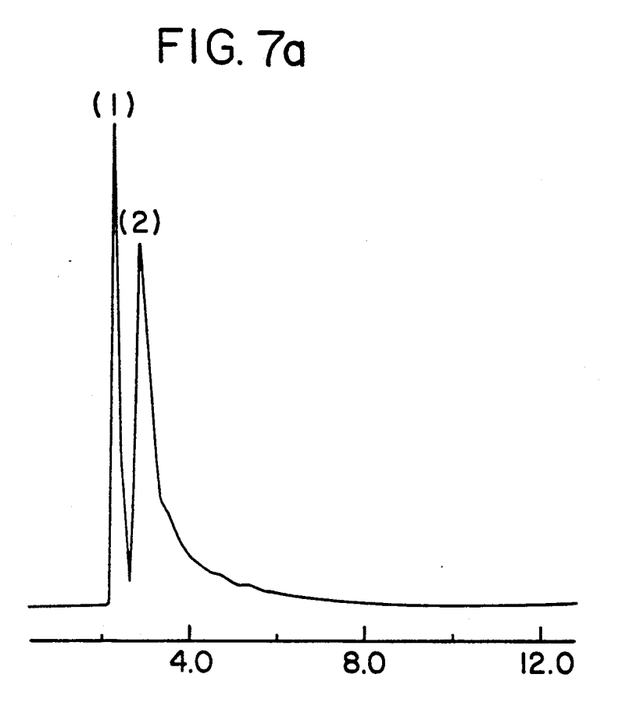
FIG. 7a shows separation of a mixture of 5-methyl-5-phenyl-hydantoin (1) and 5-(p-methylphenyl)-5-phenyl-hydantoin (2) in an alkaline medium on a column of silicon carbide modified with polybutadiene using acetonitrile/sodium phosphate buffer (pH 9.2), 20/80 (V/V) as the eluent.

A mixture of 5-methyl-5-phenylhydantoin (1) and 5-(p-methylphenyl)-5-phenylhydantoin (2) is applied to a column of silicon carbide modified with polybutadiene analogous to Example 9 and eluted using acetonitrile/0.05 M sodium hydrogen phosphate buffer (pH 9.2), 20/80 (V/V). An elution diagram shown in FIG. 7a is obtained (detection at 220 nm UV).

Example 11

Figure 7B:
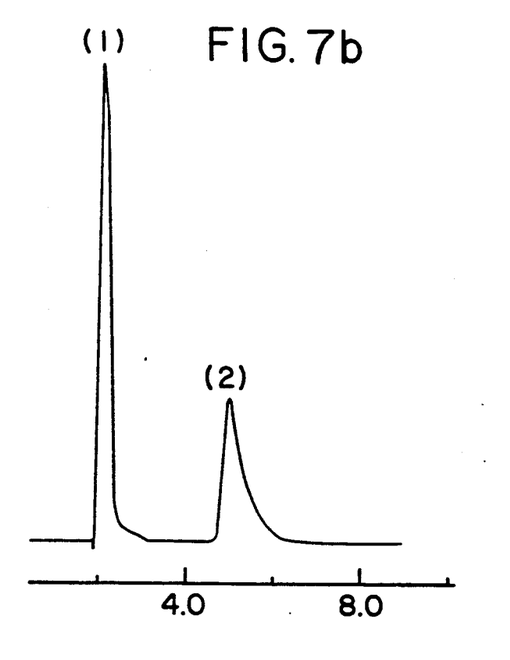
FIG. 7b shows separation of the same mixture on the same column in an acidic medium using acetonitrile/potassium phosphate buffer (pH 2.3), 10/90 (V/V) as the eluent.

Analogous to Example 10, the same mixture is chromatographed in the same column using the acidic elution mixture as in Example 9. The elution diagram shown in FIG. 7b is obtained. From FIGS. 7a and 7b, it can be seen how the selectivity of the separation can be influenced by changing the pH.

Example 12

Figure 8A:
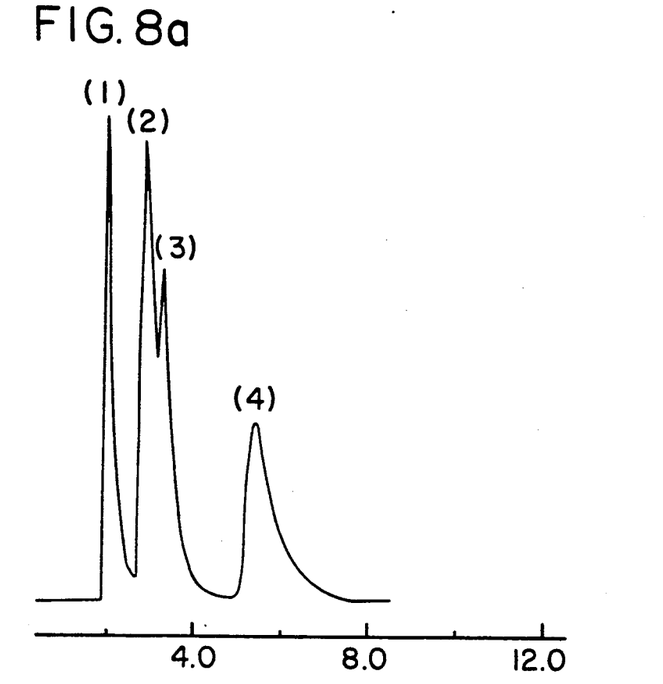
FIG. 8a shows separation of a mixture of nicotinic acid (1), diphenhydramine. HCl (2), diazepam (3), and 5-(p-methylphenyl)-5-phenylhydantoin (4) on a column of silicon carbide modified with polybutadiene in an acidic medium using acetonitrile/potassium phosphate buffer (pH 2.3), 10/90 (V/V) as the eluent.

A mixture of nicotinic acid (1), diphenhydramine.HCl (2), diazepam (3), and 5-(p-methylphenyl)-5-phenylhydantoin (4) is applied to a column of silicon carbide modified with polybutadiene analogous to Example 9 and eluted with the acidic elution mixture as in Example 9. The elution diagram shown in FIG. 8a is obtained (detection at 220 nm UV).

Example 13

Figure 8B:
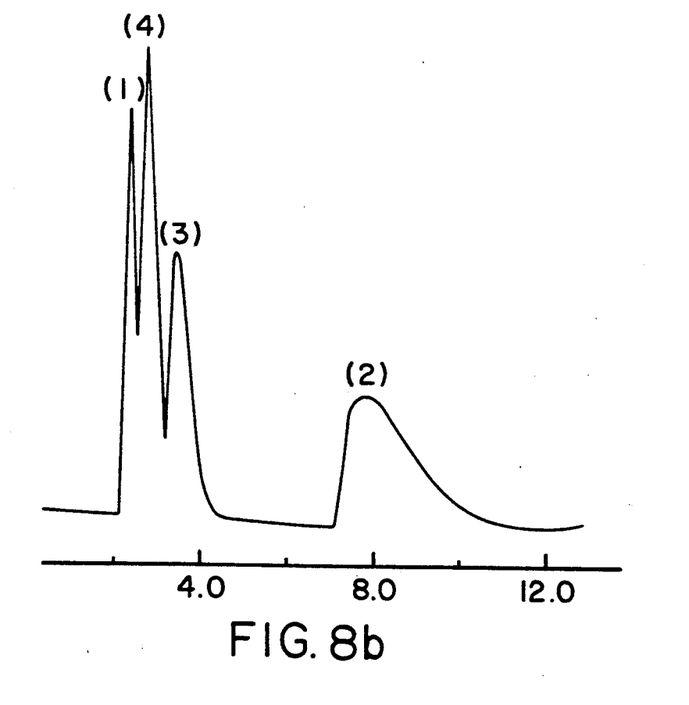
FIG. 8b shows separation of the same mixture on the same column in an alkaline medium using acetonitrile/potassium phosphate buffer (pH 9.2), 20/80 (V/V) as the eluent.

Analogous to Example 12, the same mixture is eluted in the same column using the alkaline elution mixture as in Example 10. The elution diagram shown in FIG. 8b is obtained. As the diagrams show, the selectivity of the separation is greater in an alkaline medium. At the same time, a reversal of the elution sequence can be observed owing to the increased pH.

The preceding examples can be repeated with similar success by substituting the specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In an adsorption selective liquid chromatographic process for separating at least one substance from a mixture of two or more substances using an adsorbent selective for at least one substance in said mixture, the improvement wherein said adsorsbent is essentially unporous and comprises silicon carbide having a particle size of 1–50 μm.

2. The process of claim 1, wherein the adsorbent consists essentially of silicon carbide.

3. The process of claim 1 wherein a substance is chromatographed on silicon carbide in an alkaline medium.

4. The process of claim 3, wherein the silicon carbide has at least one non-polar organic radical attached to its surface.

5. The process of claim 1, wherein a biological substance is chromatographed on silicon carbide.

6. The process of claim 1, wherein a pharmaceutically active compound is chromatographed on silicon carbide.

7. The process of claim 1, further comprising adjusting the pH of the substance to control the adsorbency of the silicon carbide.

8. The process of claim 1, wherein the silicon carbide is used as a support material.

9. The process of claim 1, wherein the silicon carbide is a film on a molded article.

10. The process of claim 1, wherein the silicon carbide is a film on an auxiliary support.

11. The process of claim 1, wherein the silicon carbide is substantially free of surface contaminants.

12. In an adsorption selective liquid chromatographic process for the separation of two or more different substances by the selective concentration of one or more substances onto a surface of an adsorbent, the improvement comprising using as said adsorbent silicon carbide or silicon carbide having a non-polar radical polymerized onto its surface, wherein said silicon carbide is in the form of an essentially unporous powder having a particle size of 1-50 μm.

13. The process of claim 11, wherein at least one of the substances being separated is alkaline.

14. The process of claim 11, wherein the substances being separated are in an alkaline medium.

* * * * *